Figure 5:
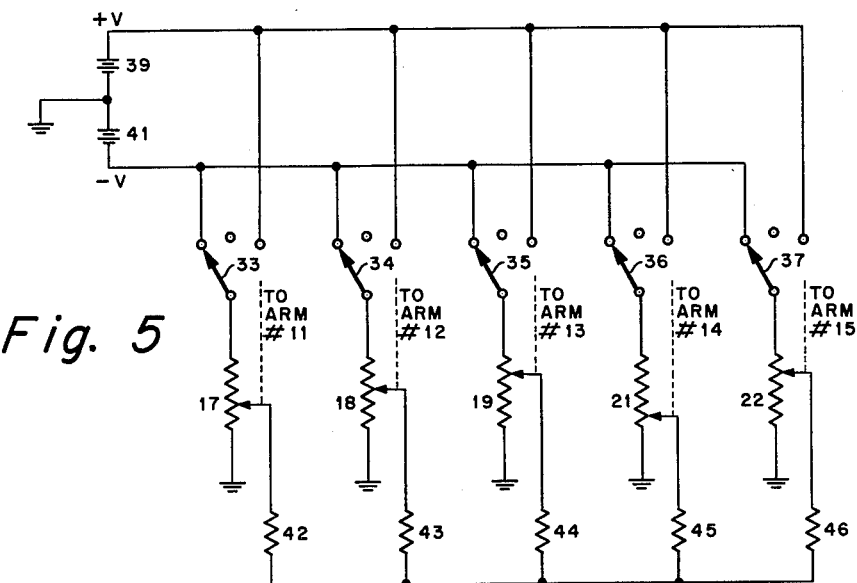

June 20, 1961 A. G. FORD 2,989,238
ROOTS LOCUS PLOTTER
Filed April 9, 1958 2 Sheets-Sheet 1
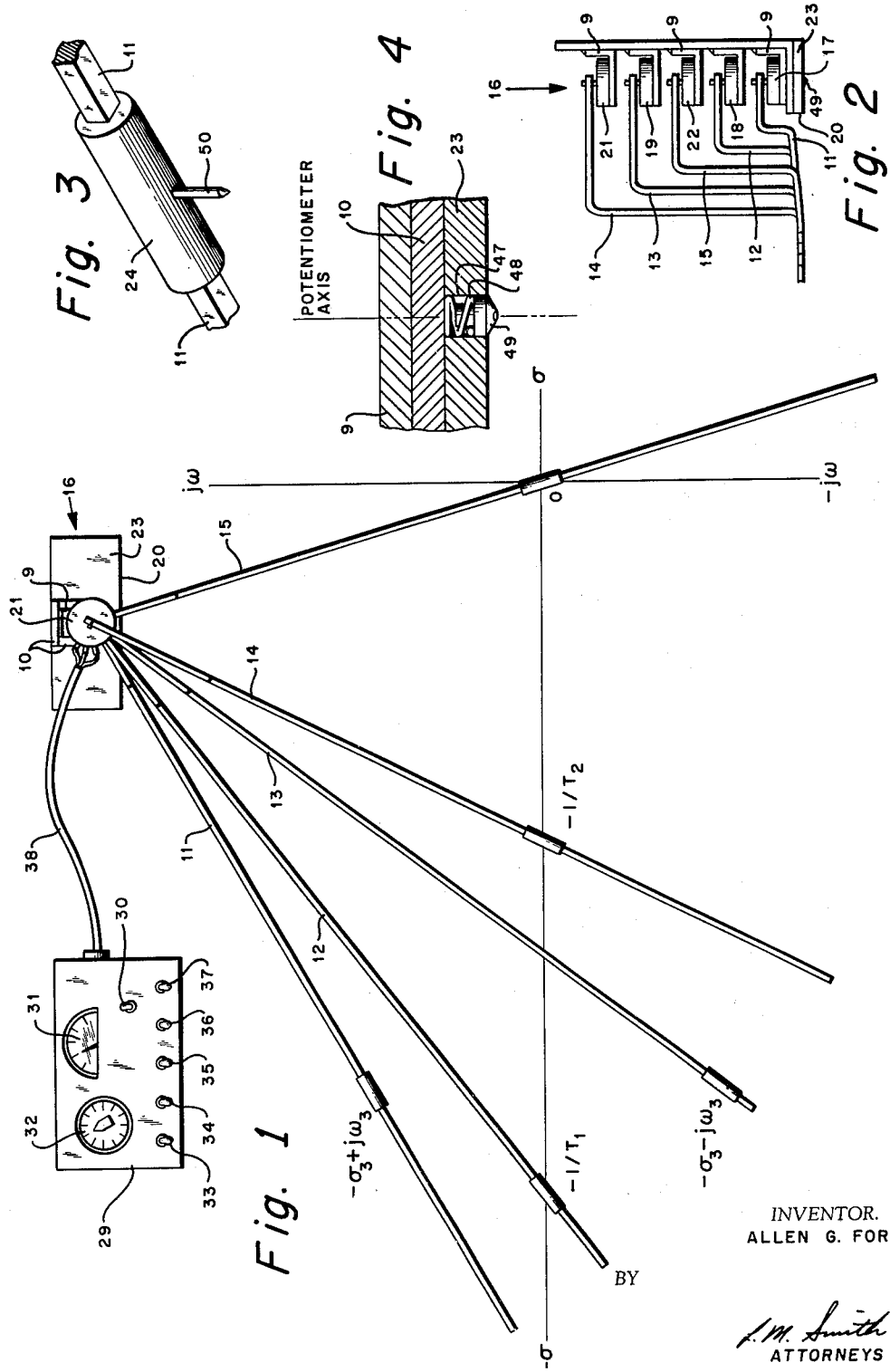
INVENTOR.
ALLEN G. FORD
BY
ATTORNEYS June 20, 1961 A. G. FORD 2,989,238
ROOTS LOCUS PLOTTER
Filed April 9, 1958 2 Sheets-Sheet 2

INVENTOR.
ALLEN G. FORD
BY
ATTORNEYS

United States Patent Office 2,989,238
Patented June 20, 1961

2,989,238
ROOTS LOCUS PLOTTER
Allen G. Ford, 3560 Mill St., Hatboro, Pa.
Filed Apr. 9, 1958, Ser. No. 727,503
12 Claims. (Cl. 235—184)
(Granted under Title 35, U.S. Code (1952), sec. 266)

The invention described herein may be manufactured and used by or for the Government of the United States of America for governmental purposes without the payment of any royalties thereon or therefor.

The present invention relates to a root locus plotter and more particularly to a root locus plotter for obtaining the locus of roots of a transfer function in a complex plane.

In order to be able to predict the performance of a physical system, it is necessary to study the physical system by theoretical means. This procedure essentially entails the synthesis of a mathematical model whose characteristics conform to those of the desired physical system. In any such analysis, the closed loop transfer function which gives insight into the transient and frequency response parameters of the overall system is of transcendent importance. Hence, various types of complex plane analyzers have been designed for graphically plotting the locus of roots of the closed loop transfer function for a control system under study. In general, the devices of the prior art embrace trial and error procedures which are frequently laborious in character, especially for differential equations of order higher than four. The plethora of manual steps are required in plotting the locus, such that not only is an undue amount of time necessitated, but also, due to the nature of these devices the locus of the roots must be inherently plotted in a discontinuous manner.

On the other hand, the instant invention presents novel means independent of trial and error procedures for achieving a continuous graphic plot of the locus of roots of a closed loop transfer function for the control system under consideration. In essence, the inventive embodiment represents an extension of the principles presented in an article titled "Control System Synthesis by Root Locus Method," vol. 69, part I, by Walter R. Evans, published in 1950 in the transactions of the American Institute of Electrical Engineers. Conterminous with the principles therein set forth, the instrumentality of the instant invention may be summarily described as comprising a plurality of ganged potentiometers with supporting means therefor forming the plotter head of the device, and a corresponding plurality of rod-shaped arms which are attached to respective wiper portions of the potentiometers and disposed radially in a plane to intercept the poles or zeros of the open loop transfer function. When a summation of currents resulting from the voltage outputs of the potentiometers is maintained at a predetermined constant value during movement of the plotter head, the aggregate sum of the angles formed by the intersection of the rod-shaped arms with the real axis in the complex plane of the transfer function is a constant equal to 180°. Accordingly, so long as movement of the plotter head maintains this condition, the path traversed by the plotter head is the locus of the roots of the closed loop transfer functions for the system. Thus, the inventive device generates directly a graphical locus plot in a continuous manner, providing an immediate insight into the transient and frequency response parameters of the system.

An object of the present invention is the provision of a root locus plotter for graphically plotting in a complex plane the locus of roots of the closed loop transfer function for a system.

Another object is to provide a root locus plotter to directly effect a continuous graphic locus plot of the roots of the closed loop transfer function for a system.

A further object of the invention is the provision of a root locus plotter in which a movable plotter head may be manually positioned to directly effect a continuous graphical locus plot of the roots of the closed loop transfer function for a system.

A final object of the present invention is the provision of a root locus plotter in which a movable plotter head is manually positioned such that a summation of the angles with the real axis formed by the intersection therewith of radial arms passing through the roots of the open loop transfer function is maintained at a predetermined constant to effect a continuous graphical locus plot of the roots of the closed loop transfer function for a system.

The exact nature of this invention as well as other objects and advantages thereof will be readily apparent from consideration of the following specification relating to the annexed drawing in which:

FIG. 1 is a plan view of a preferred embodiment of the root locus plotter showing in general its application in conjunction with the roots of a specific transfer function.

Figure 6:
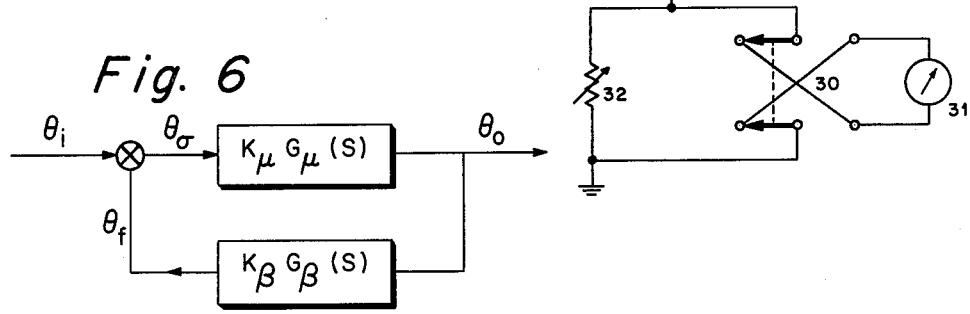
Figure 7:
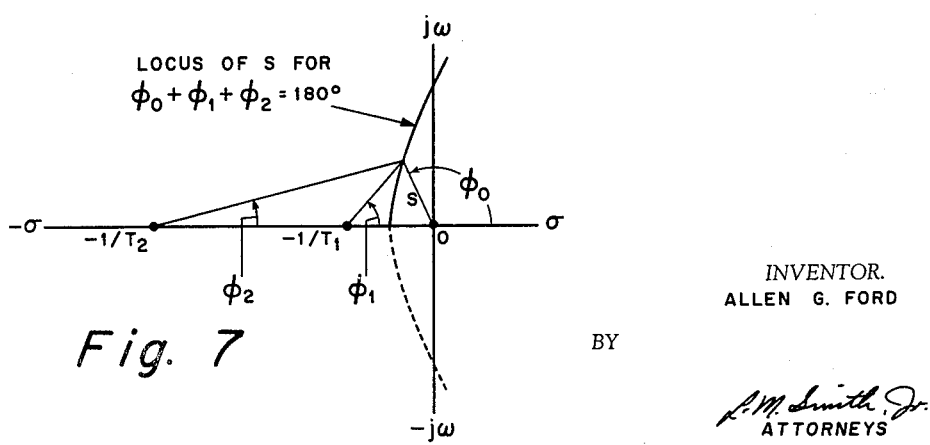

FIG. 2 is a side elevation view of the plotter head of the root locus plotter shown in FIG. 1, FIG. 3 is a pictorial presentation of a preferred type of restraining sleeve, showing in greater particularity the manner in which the sleeve effects pivotal and slidable movement of a radial arm, FIG. 4 is a cross-sectional view of a preferred graphic marking means for graphically effecting the locus plot, FIG. 5 is an electrical schematic diagram of the preferred embodiment shown in FIG. 1, FIG. 6 illustrates a general block diagram of a typical closed loop system, and FIG. 7 depicts an exemplary locus plot of the roots for the transfer function of the system shown in FIG. 6 in which the feedback is unity.

Referring now to the drawings, wherein like reference characters designate like or corresponding parts throughout the several views, there is shown in FIG. 1 a plurality of rod-shaped arms 11, 12, 13, 14 and 15 extending radially from a plotter head 16 incorporating a corresponding plurality of vertically stacked potentiometers. The arms may be round, but for enhanced operating characteristics of the device, arms of square construction are preferred. FIG. 2 illustrates in greater particularity a side elevation view of the potentiometers which are mounted in vertical column by means of brackets 9 and 10. The wiper shaft of each of the potentiometers 17, 18, 19, 21 and 22 is fixedly attached to its associated radial arm by a set screw, or the like, so that rotation of the wiper shaft is effected directly with movement of the arm. A base plate 23 of a generally rectangular shape has an edge 20 which is maintained parallel to the abscissa or real axis of the complex plane during translation of the plotter head in the operation of the device. When graph paper having grid lines is used, edge 20 may of course be maintained parallel to the grid lines, themselves being parallel to the abscissa. With respect to the presentation of FIG. 1, it should be understood that the plane in which the arms are disposed corresponds to the complex plane having the real axis, $\sigma$ and the imaginary axis, $jW$. Each of the arms illustrated in FIG. 1 is constrained for pivotal and sliding movement in the complex plane at a point where it intercepts either a zero or a pole of the open loop transfer function. This constraint is achieved by sleeves 24, 25, 26, 27 and 28 which are mounted slidably upon and preferably non-rotatable about the longitudinal axes of the respective arms as pictorially illustrated in FIG. 3. Pertinent to implementing the denoted pivotal and sliding action are nail-like projections 50, or the like, which protrude from the underside of each of the sleeves. These projections extend through the graph paper on which the locus is to be plotted and into the drawing board proper. In the interest of obtaining perpendicularity of these projections to both the plane of the graph paper and its respectively associated arm, the sleeves are restrained against rotation about the arms which are preferably of square construction, as shown in FIG. 3, for relatively non-rotatable sliding engagement with the sleeves. FIGURE 4 depicts in greater particularity a cross-sectional view of the graphic marking assembly, taken on the axis of the potentiometer shafts. The base plate 23 contains a cylindrical recess 47 in which is inserted a spring 48 which exerts pressure on a stylus or ball point pen 49 having a self-contained ink supply. Alternatively, in its simplest form, the pen 49 may be a length of graphite supported and arranged to coact with the spring. An indicator 29 contains a conventional D.C. ammeter 31, preferably a microammeter of suitable sensitivity. A control 32 is provided to facilitate calibration of meter 31. A plurality of S.P.D.T. toggle switches 33, 34, 35, 36 and 37 are utilized, the function of which will be apparent subsequently. A multiple wire cable 38 provides electrical interconnection between each of the potentiometers and indicator 29.

Referring next to FIG. 5, which illustrates an electrical schematic diagram of the preferred embodiment shown in FIG. 1, the potentiometers 17 through 22 are applied the voltage of either battery 39 or 41, depending upon the position of switches 33 through 37. Inasmuch as the junction of these batteries is grounded, the voltages selectively supplied the potentiometers through these switches may be either positive or negative in polarity. This choice of polarities is essential since the setting of respective switches is dependent upon whether the root of the open loop transfer function is a pole or a zero. The wiper portions of potentiometers 17 through 22 are mechanically connected to radial arms 11 through 15, respectively, as indicated by the dotted line representations in FIG. 5. The resistors 42 through 46 preferably may be of the order of $10^4$ ohms or thereabouts and constitute isolation load resistors. In order to avoid excessive power dissipation and to minimize loading, the ratio of the value of these resistors relative to that of the potentiometers may be of the order of 100:1. The lower ends of the resistors are joined, forming a common junction. Microammeter 31 shunted by variable resistance 32 having a value of the order of $10^3$ ohms is thence connected between this common junction and ground. The reversing switch 30 permits reversal of current to microammeter 31, as may be desirable in specific instances. A suitable resistance may be selectively inserted in series with microammeter 31 by means of a switch if sensitivity of the microammeter is desired to be controlled.

Thus, it will be apparent that the illustrative arrangement provides for the wipers of the respective potentiometers to supply fractionated voltages according to the disposition of the radial arms in the complex plane. Since the currents produced are a linear function of the voltages picked off by the potentiometers, microammeter 31 connected to effect an algebraic summation of these currents indicates a value which is representative of the total angular displacement of all the radial arms.

Preparatory to a discussion of the manner of operating the root locus plotter to effect a graphic locus plot, a brief consideration of the principles upon which the inventive device is based appears desirable. Consider the closed loop system shown in FIG. 5. Note that each transfer function is of the form $KG(s)$ in which K is a static gain constant and $G(s)$ is a function of the complex number. In general, $G(s)$ has both numerator and denominator known in factored form. The values of $(s)$ which make the function zero or infinite can therefore be seen by inspection and are called zeros and poles, respectively. The closed loop transfer function can be expressed directly from FIG. 5 as given in the following Equation 1:

$$\frac{\theta}{\theta_1}(s) = \frac{K_\mu G_\mu(s)}{1 + K_\mu G_\mu(s) K_\beta G_\beta(s)} \qquad (1)$$

The denominator of Equation 1 contains the characteristic equation in which the open loop transfer function is expressed by $K_\mu G_\mu(s) K_\beta G_\beta(s)$.

In order to determine the poles of the overall transfer function the characteristic equation is set equal to zero. This is analogous to finding the roots of a differential equation as a step in determining its transient response, i.e., $1 + K_\mu G_\mu(s) K_\beta G_\beta(s) = 0$, which may be written as $K_\mu G_\mu(s) K_\beta G_\beta(s) = -1$. If the equation is satisfied for varying values of $K_\mu G_\beta$, then the poles of the overall transfer function describe a locus in the complex $s$ plane. Since the open loop transfer function $K_\mu G_\mu(s) K_\beta G_\beta(s)$ is a vector quantity, the characteristic equation may be expressed as follows:

$$|K_\mu G_\mu(s) K_\beta G_\beta(s)| = -1 \qquad (2)$$

in which,

Angle $K_\mu G_\mu(s) K_\beta G_\beta(s) = 2_n + 1)\pi$ where $$n = 0, \pm 1, \pm 2 \ldots \pm n$$

These vector properties are the basis for the root locus method as set forth in the Transactions of the American Institute of Electrical Engineers.

The open loop transfer function is typically of the form given in Equation 3.

$$K_\mu G_\mu(s) K_\beta G_\beta(s) = \frac{K(1+T_2 s)[\sigma_3^2 + W_3^2]}{s(1+T_1 s)[(s+\sigma_3)^2 + W_3^2]} \qquad (3)$$

The parameters such as $T_1$ are constant for a given problem, whereas $s$ assumes many values; therefore, it is convenient to convert Equation 3 to the form of Equation 4.

$$K_\mu G_\mu(s) K_\beta G_\beta(s) = \frac{K(1/T_2 + s) T_2[\sigma_3^2 + W_3^2]}{s(1/T_1 + s) T_1[(s+\sigma_3+jW_3)(s+\sigma_3-jW_3]} \qquad (4)$$

With respect to FIG. 1, a general value of $s$ is assumed and the poles and zeros of this function are plotted, as therein indicated. Note that for this specific transfer function, the root $$-\frac{1}{T_2}$$

is a zero, all other roots being poles. Thus, in FIG. 1 the radial arms of the inventive device are illustrated in typical application to intercept the poles and zeros of the open loop transfer function for the system.

The operation of the root locus plotter may best be set forth by way of a simple example such as that shown in FIG. 6 in which the transfer functions are given by Equation 5 with the feedback term $K_\beta G_\beta(s)$ being equal to unity.

$$K_\mu G_\mu(s) = \frac{K}{(1+T_1 s)(1+T_2 s)s} \qquad (5)$$

The poles of the open loop transfer function are $$0, -\frac{1}{T_1}, \text{ and } -\frac{1}{T_2}$$

as represented by dots in FIG. 7. Since there are but three roots, all of them poles, only three radial arms need be used, say 13, 14 and 15. Accordingly, the projections extending from the restraining sleeves associated with these radial arms are forced into the drawing board at points which intercept respectively the indicated poles of this transfer function.

The instrument is next calibrated in accordance with principles for implementing the root locus method. The edge 20 of base 23 is set parallel with the real axis and all the S.P.D.T. switches except one, say switch 33 associated with the radial arm 11 are in the Off or midposition. Arm 11 is thence manually swept through an angle until its length is positioned parallel with the real axis, in which position of the arm the wiper of potentiometer 17 is concurrently positioned at ground potential in order to establish a zero current reading on meter 31 conterminous with zero angular displacement of arm 11. Radial arm 11 is thereupon swept through a full semi-circle or 180° until its length is again parallel to the real axis, but lying oppositely in this instance. Accordingly, the wiper of potentiometer 17 is concurrently positioned to pick-off a voltage proportional to its 180° angular rotation, and meter 31 indicates a current reading corresponding to this 180° rotation of the arm. This reading may be set to some nominal value with the aid of the shunt calibration control 32, and its value is noted for future use. The instrument is now calibrated, and switch 33 is set to the Off position.

It is deemed apposite to presently discuss the significance of switches 33 through 37, which function to selectively supply a potentiometer excitation voltage of either positive or negative polarity. With respect to FIG. 7, the angle of a vector extending from a pole measured counterclockwise is considered negative, and positive when measured clockwise. The angle of a vector extending from a zero measured counterclockwise is positive, and negative for clockwise rotation. For actual practical use, it does not matter whether or not the above convention is used, so long as vectors from poles in the same general sense as those emanating from zeros have angles of opposite sign. Accordingly, switches 35 through 37 must be preset in conformance with nature of the roots involved. Inasmuch as only poles are contained in the illustrative transfer function of Equation 5, these switches may be all closed uniformly in one position or the other compatible with reversing switch 30.

With respect to the specific application herein considered, the closing of switches 35, 36 and 37 is instrumental to effect linear current flow in each of resistors 44, 45 and 46, the total current flow being analogous to the sum of the angles formed by the respective intersections of radial arms 13, 14 and 15 with the real axis. In order to plot a locus of the roots shown in FIG. 6, the plotter head is manually positioned so that the current value previously noted remains constant while at the same time observing that edge 20 of base 23 is parallel with the real axis. Hence, the locus of $s$ in the complex for $$\phi_0 + \phi_1 + \phi_2 = 180°$$

is shown plotted above the real axis. Since the locus is symmetrical about the real axis, the portion of the locus indicated by the dashed curve lying below the real axis is a mirror image and may be graphically supplied with conventional drafting aids.

It should be understood that the description of the operating technique set forth above provides for a continuous graphic locus plot, the accuracy of which is determined by the skill of the operator. If so desired, a very accurate locus plot may be obtained by discretely plotting successive points through which a curve may be drawn later. This alternative technique is simply effected by interposing a piece of paper between the graphic marking means and the graph paper, preventing the locus plot from being drawn. An accurate determination of the predetermined value of current is then made, thus precisely establishing a point on the locus plot, which may then be recorded on the graph by removing the paper shield to record an accurate point on the curve.

Thus, in the manner set forth, the root locus plotter of the instant invention plots directly the locus of roots of a closed loop transfer function for a given control system, obviating trial and error techniques previously compelled to be used in the prior art. The plotter head effects positioning of the potentiometers, which produce respective voltage outputs according to the disposition of the radial arms intercepting the roots of the open loop transfer function. By maintaining the resultant current produced by these voltages at a predetermined constant during translation of the plotter head, a continuous graphical locus is generated, permitting an immediate insight into the transient and frequency response parameters for the physical system under consideration.

Though the preferred embodiment of the inventive root locus plotter is entirely adequate for solution of transfer functions requiring no more than five radial arms, it should be understood that the instant invention is fundamentally adapted to accommodate as many arms as may be dictated by the problem at hand. Furthermore, while the instant invention is specifically shown for use with direct current, alternating current supplied by a transformer having a center-tapped secondary may be used. In addition, though the summation of angles in the instant invention is performed by obtaining a summation of electrical currents, it is deemed that a summing voltage amplifier may be used instead to add voltages representative of the angles involved. Moreover, though it is fundamental in the operation of the instant invention that the base of the plotter head be maintained parallel to the abscissa, or to a grid line which itself is parallel to the abscissa, it is deemed apparent that suitable linkage may be employed to automatically maintain this parallelism.

Obviously many modifications and variations of the present invention are possible in the light of the above teachings. It is therefore to be understood that within the scope of the appended claims, the invention may be practiced otherwise than as specifically described.

What is claimed is:

1. A root locus plotter for effecting a graphic locus plot of the roots of a closed loop transfer function for a system, comprising plotter head means including a plurality of voltage fractionating means therein, a corresponding plurality of radial elements disposed for movement in a plane and respectively coupled to the fractionating means to effect respective fractionated voltages proportional to the angular disposition, with respect to a reference position, of the radial elements, a corresponding plurality of load impedances each electrically connected to the respective fractionating means and joined at the opposite ends thereof to form a common junction, and current indicating means electrically connected between said common junction and the fractionating means to indicate total current flow, the plotter head means being manually displaced to maintain the current flow at a predetermined constant value to thereby generate a graphical locus plot of the roots of said closed loop transfer function.

2. A root locus plotter for effecting a graphic locus plot of the roots of a closed loop transfer function for a system, comprising plotter head means including a plurality of voltage fractionating means, switch means operably connected to a potential source to selectively supply excitation of either positive or negative polarity to each of the fractionating means, a corresponding plurality of elongated radial elements disposed for angular displacement in a common plane and respectively mechanically coupled to the fractionating means to effect respective fractionated voltages proportional to the angular disposition, with respect to a reference position, of the radial elements, a corresponding plurality of load resistances each electrically connected to the respective fractionating means and joined at the opposite ends thereof to form a common junction, and current indicating means electrically connected between said common junction and the fractionating means to indicate total current flow, the plotter head means being manually displaced to maintain the current flow at a predetermined constant value to thereby generate a graphical locus plot of the roots of said closed loop transfer function.

3. A root locus plotter for effecting a graphic locus plot of the roots of a closed loop transfer function for a system, comprising plotter head means including a plurality of voltage fractionating means, switch means operably connected to a potential source to selectively supply excitation of either positive or negative polarity to each of said fractionating means, a corresponding plurality of elongated radial arms disposed for movement in a common plane intercepting the roots of the open loop transfer function for the system and respectively mechanically coupled to the fractionating means to effect respective fractionated voltages proportional to the angular disposition, with respect to a reference position, of the radial arms, restraining means fixed at points corresponding to said latter roots to restrict the radial arms to pivotal and sliding movement in said plane, a corresponding plurality of load resistances each electrically connected to the respective fractionating means and joined at the opposite ends thereof to form a common junction, and current indicating means electrically connected between said common junction and the fractionating means to indicate total current flow, the plotter head means being manually displaced to maintain the current flow at a predetermined constant value to thereby generate a graphical locus plot of the roots of said closed loop transfer function.

4. A root locus plotter for effecting a graphic locus plot of the roots of a closed loop transfer function for a system, comprising plotter head means including a plurality of potentiometers each having a wiper portion, switch means operably connected to a potential source to selectively supply excitation of either positive or negative polarity to each of said potentiometers, a corresponding plurality of radial arms disposed for movement in a plane intercepting the roots of the open loop transfer function for the system and respectively coupled to the wiper portion of the potentiometers to effect respective fractionated voltages proportional to the angular disposition, with respect to a reference position, of the radial arms, a corresponding plurality of load resistances each electrically connected to the respective wiper portions and joined at the opposite ends thereof to form a common junction, and an ammeter electrically connected between said common junction and the potentiometers to indicate total current flow, the plotter head means being manually positioned to maintain the current flow at a predetermined constant value to thereby generate a graphical locus plot of the roots of said closed loop transfer function.

5. A root locus plotter for effecting a graphic locus plot of the roots of a closed loop transfer function for a system, comprising plotter head means including a plurality of potentiometers each having a wiper portion, a corresponding plurality of radial elements disposed for movement in a plane intercepting the roots of the open loop transfer function for the system and respectively coupled to the wiper portion of each of the potentiometers to effect respective fractionated voltages proportional to the angular disposition, with respect to a reference position, of the radial elements, restraining means fixed at points corresponding to said latter roots to restrict the radial elements to pivotal and sliding movement in said plane, a corresponding plurality of load resistances each electrically connected to the respective wiper portions and joined at the opposite ends thereof to form a common junction, and current indicating means electrically connected between said common junction and the potentiometers to indicate total current flow, the plotter head means being manually positioned to maintain the current flow at a predetermined constant value to thereby generate a graphical locus plot of the roots of said closed loop transfer function.

6. A root locus plotter for effecting a graphic locus plot of the roots of a closed loop transfer function for a system, comprising plotter head means including a plurality of potentiometers each having a wiper portion, switch means operably connected to a potential source to selectively supply excitation of either positive or negative polarity to each of said potentiometers, a corresponding plurality of radial arms disposed for movement in a plane intercepting the roots of the open loop transfer function for the system and respectively coupled to the wiper portion of each of the potentiometers to effect respective fractionated voltages proportional to the angular disposition, with respect to a reference position, of the radial arms, restraining means fixed at points corresponding to said latter roots to restrict the radial arms to pivotal and sliding movement in said plane, a corresponding plurality of load resistances each electrically connected to the respective wiper portions and joined at the opposite ends thereof to form a common junction, and an ammeter electrically connected between said common junction and the potentiometers to indicate total current flow, the plotter head means being manually positioned to maintain the current flow at a predetermined constant value to thereby generate a graphical locus plot of the roots of said closed loop transfer function.

7. A root locus plotter for effecting a graphic locus plot of the roots of a closed loop transfer function for a system, comprising a positionable plotter head means having potentiometers mounted in vertical column and including respective wiper shafts in substantially coaxial alignment, a corresponding plurality of radial arms respectively coupled to the wiper shafts and disposed for collective movement in a plane with translation of the plotter head means to effect respective fractionated output voltages from said potentiometers proportional to the angular disposition, with respect to a reference position, of said radial arms in the plane, a sleeve concentrically mounted onto each radial arm and including a projection extending normally therefrom and perpendicularly into the plane at a point corresponding to one of a plurality of roots of the open loop transfer function of the system to restrict each of said arms to slidable and pivotal movement about respective points associated with said latter roots, a corresponding plurality of load resistances each electrically connected to respective wipers of said potentiometers and joined at the opposite ends thereof to form a common junction, and current indicating means electrically connected between said common junction and the potentiometers to indicate total current flow, the plotter head means being positioned to maintain the current flow at a predetermined constant value to thereby generate a graphical locus plot of the roots of said closed loop transfer function.

8. A root locus plotter for effecting a graphic locus plot of the roots of a closed loop transfer function for a system, comprising a manually positionable plotter head means having potentiometers mounted in vertical column one above the other and including respective wiper shafts in substantially coaxial alignment, a corresponding plurality of radial arms respectively coupled to the wiper shafts and disposed for collective movement in a plane with translation of the plotter head means to effect respective fractionated output voltages from said potentiometers proportional to the angular disposition, with respect to a reference position, of said radial arms in the plane, a sleeve concentrically mounted onto each radial arm and including a projection extending normally therefrom and perpendicularly into the plane at a point corresponding to one of a plurality of roots of the open loop transfer function of the system to restrict each of said arms to slidable and pivotal movement about respective points associated with said latter roots, a corresponding plurality of load resistances each electrically connected to respective wipers of said potentiometers and joined at the opposite ends thereof to form a common junction, and an ammeter including a variable resistance in shunt connection therewith electrically connected between said common junction and the potentiometers to indicate total current flow, the plotter head means being manually positioned to maintain the current flow at a predetermined constant value to thereby generate a graphical locus plot of the roots of said closed loop transfer function.

9. A root locus plotter for effecting a graphic locus plot of the roots of a closed loop transfer function for a system, comprising a manually positionable plotter head means having potentiometers mounted in vertical column one above the other and including respective wiper shafts in substantially coaxial alignment, a corresponding plurality of switches operably connected to a potential source to selectively supply excitation of either positive or negative polarity to each of said potentiometers, a corresponding plurality of radial arms respectively coupled to the wiper shafts and disposed for collective movement in a plane with translation of the plotter head means to effect respective fractionated output voltages from said potentiometers proportional to the angular disposition, with respect to a reference position, of said radial arms in the plane, a sleeve concentrically mounted onto each radial arm and including a projection extending normally therefrom and perpendicularly into the plane at a point corresponding to one of a plurality of roots of the open loop transfer function of the system to restrict each of said arms to slidable and pivotal movement about respective points associated with said latter roots, a corresponding plurality of load resistances each electrically connected to a wiper of said potentiometers and joined at the opposite ends thereof to form a common junction, and an ammeter including a variable resistance in shunt connection therewith electrically connected between said common junction and the potentiometers to indicate total current flow, the plotter head means being manually positioned to maintain the current flow at a predetermined constant value to thereby generate a graphical locus plot of the roots of said closed loop transfer function.

10. A root locus plotter for effecting in a complex plane a graphic locus plot of the roots of a closed loop transfer function for a system, comprising a manually positionable plotter head means comprising a base plate arranged for sliding contact movement with the complex plane and having an edge thereof maintained substantially parallel with a real axis of said complex plane during translation of the plotter head means, and a plurality of potentiometers mounted on said base plate in vertical column one above the other including respective wiper shafts in substantially coaxial alignment, a corresponding plurality of radial arms respectively coupled to the wiper shafts and disposed for collective movement in a plane with positioning of the plotter head means to effect respective fractionated output voltage from said potentiometers proportional to the angular disposition, with respect to a reference position, of said radial arms in the plane, a sleeve concentrically mounted onto each radial arm and including a projection extending normally therefrom and perpendicularly into the plane at a point corresponding to one of a plurality of roots of the open loop transfer function of the system to restrict each of said arms to slidable and pivotal movement about respective points associated with said latter roots, a corresponding plurality of load resistances each electrically connected to a wiper of said potentiometers and joined at the opposite ends thereof to form a common junction, and an ammeter including a variable resistance in shunt connection therewith electrically connected between said common junction and the potentiometers to indicate total current flow, the plotter head means being manually positioned to maintain the current flow at a predetermined constant value to thereby generate a graphical locus plot of the roots of said closed loop transfer function in the complex plane.

11. A root locus plotter for effecting in a complex plane a graphic locus plot of the roots of a closed loop transfer function for a system comprising a manually positionable plotter head means comprising a base plate including therein a graphical marking means, and a plurality of potentiometers mounted on said base plate in vertical column one above the other including respective wiper shafts in substantially coaxial alignment, a corresponding plurality of switches operably connected to a potential source to selectively supply excitation of either positive or negative polarity to each of said potentiometers, a corresponding plurality of radial arms respectively coupled to the wiper shafts and disposed for collective movement in a plane with translation of the plotter head means to effect respective fractionated output voltages from said potentiometers proportional to the angular disposition, with respect to a reference position, of said radial arms, a sleeve concentrically mounted onto each radial arm and including a projection extending normally therefrom and perpendicularly into the plane at a point corresponding to one of a plurality of roots of the open loop transfer function of the system to restrict each of said arms to slidable and pivotal movement about respective points associated with said latter roots, a corresponding plurality of load resistances each electrically connected to respective wipers of said potentiometers and joined at the opposite end thereof to form a common junction, and an ammeter including a variable resistance in shunt connection therewith electrically connected between said common junction and the potentiometers to indicate total current flow, the plotter head means being manually positioned to maintain the current flow at a predetermined constant value so that the marking means generates a graphical locus plot of the roots of said closed loop transfer function in the complex plane.

12. A root locus plotter for effecting in a complex plane a graphic locus plot of the roots of a closed loop transfer function for a system, comprising a manually positionable plotter head means comprising a base plate arranged for sliding contact movement with the complex plane and having an edge thereof maintained substantially parallel with a real axis of said complex plane during translation of the plotter head means, and a plurality of potentiometers mounted on said base plate in vertical column one above the other including respective wiper shafts in substantially coaxial alignment, a corresponding plurality of switches operably connected to a potential source to selectively supply excitation to said potentiometers of either positive or negative polarity, a corresponding plurality of radial arms respectively coupled to the wiper shafts and disposed for collective movement in a plane with positioning of the plotter head means to effect respective fractionated output voltages from said potentiometers proportional to the angular disposition, with respect to a reference position, of said radial arms, a sleeve concentrically mounted onto each radial arm and including a projection extending normally therefrom and perpendicularly into the plane at a point correspond- to one of a plurality of roots of the open loop transfer function of the system to restrict each of said arms to slidable and pivotal movement about respective points associated with said latter roots, a corresponding plurality of load resistances each electrically connected to respective wipers of said potentiometers and joined at the opposite end thereof to form a common junction, and an ammeter including a variable resistance in shunt connection therewith electrically connected between said common junction and the potentiometers to indicate total current flow, the plotter head means being manually positioned to maintain the current flow at a predetermined constant value to thereby generate a graphical locus plot of the roots of said closed loop transfer function in the complex plane.

References Cited in the file of this patent
UNITED STATES PATENTS

| | | |
|---|---|---|
| 2,535,942 | Lewis et al. | Dec. 26, 1950 |
| 2,595,185 | Zauderer et al. | Apr. 29, 1952 |
| 2,849,182 | Winterhalter | Aug. 26, 1958 |